United States Patent [19]
DeSantis

[11] 4,166,716
[45] Sep. 4, 1979

[54] MECHANICAL TOGGLE AND FLUID ACTUATED RAM FOR POWDER COMPACTING PRESS

[75] Inventor: Raymond P. DeSantis, Royal Oak, Mich.

[73] Assignee: PTX-Pentronix, Inc., Lincoln Park, Mich.

[21] Appl. No.: 798,823

[22] Filed: May 20, 1977

[51] Int. Cl.² .................. B30B 11/02; B30B 15/06
[52] U.S. Cl. .................................... 425/78; 425/352; 425/406; 92/13.5
[58] Field of Search .................. 425/78; 92/13.5, 13.6, 92/13.8

[56] References Cited

U.S. PATENT DOCUMENTS

| | | | |
|---|---|---|---|
| 2,449,515 | 9/1948 | Seelig | 425/78 X |
| 3,104,592 | 9/1963 | Sheesley | 92/13.5 |
| 3,146,681 | 9/1964 | Sheesley | 92/13.5 |
| 3,172,182 | 3/1965 | Aosman | 425/78 |
| 3,173,337 | 3/1965 | Cunningham | 92/13.5 X |
| 3,213,886 | 10/1965 | Pearne | 92/13.5 X |
| 3,345,691 | 10/1967 | Aoki | 425/DIG. 220 |
| 3,524,220 | 8/1970 | Davison | 425/78 |
| 3,609,816 | 10/1971 | Mc Donald | 425/DIG. 222 |
| 3,664,784 | 5/1972 | Sibley | 425/78 |
| 3,687,586 | 8/1972 | Hara et al. | 425/78 |
| 3,712,774 | 1/1973 | Parker | 425/DIG. 222 |
| 3,826,599 | 7/1974 | DeSantis et al. | 125/78 |

*Primary Examiner*—J. Howard Flint, Jr.
*Attorney, Agent, or Firm*—Hauke and Patalidis

[57] ABSTRACT

An improvement for a press, more particularly a press for compacting powder material, provided with a mechanical toggle mechanism actuated ram disposed above the die supporting bed or table of the press. The mechanical toggle mechanism is in turn actuated by the press drive. The pivot support for the ram upper toggle arm is independently reciprocated by a fluid cylinder activated in timed relationship with the mechanical toggle action such as to provide reciprocation of the ram independently of or in addition to the reciprocation caused by the toggle mechanism. Adjustable abutment means are provided for adjustably setting the extreme positions of the fluid cylinder reciprocating member.

2 Claims, 8 Drawing Figures

MECHANICAL TOGGLE AND FLUID ACTUATED RAM FOR POWDER COMPACTING PRESS

BACKGROUND OF THE INVENTION

The present invention relates to presses, more particularly powder compacting presses, provided with a reciprocable ram disposed above the press die supporting bed. More specifically, the invention relates to an improved mechanism for actuating the ram of a press and consisting of a combination of a mechanical toggle mechanism and fluid operated mechanism.

The present invention is an improvement on the press disclosed in U.S. Pat. No. 3,826,599, assigned to the same assignee as the present invention. The press disclosed in the aforesaid patent is provided with a ram disposed above the press bed in which is mounted a powder compacting apparatus comprising a die plate having one or a plurality of die cavities disposed therein. A punch is reciprocably disposed in each die bore and is actuated by the drive mechanism of the press by means, for example, of a powder-driven camshaft and appropriate cam followers driving the punch holder. A ram is reciprocably disposed above the press bed, therefore above the die plate, and is reciprocated in timed relationship with the reciprocation of the punch holder by an appropriate cam, cam follower, lever and toggle mechanism. A set of punches, each adapted to cooperate with a punch disposed in a die bore, can be mounted on the end of the ram and, or in addition, the ram, in its fully extended position, may be used to clamp over the die plate an anvil adapted to close the die cavity or cavities, and having a face overlapping the die cavity opening or openings, against which the powder material disposed in the die cavities is compacted by the punch or punches held in the die bore or bores. The anvil, together with a powder material dispenser and a finished part pick-up mechanism, is mounted on the end of a positioning arm, such as to be arcuately or linearly displaced and positioned over the die cavities in timed relationship with the die cavity filling step, the compacting step and the finished article ejection step. Such an arrangement of elements is described in the aforesaid patent and in U.S. Pat. Nos. 3,561,054 and 3,574,892, for example, of common ownership herewith.

The present invention is an improvement on the ram operating toggle mechanism of U.S. Pat. No. 3,826,599. The improvement consisting in providing a floating fluid pressure displaceable anchoring and pivoting point for the ram toggle mechanism, such that the ram may additionally be longitudinally displaced as a result of the reciprocation of the anchoring and pivoting point. Adjustable limit abutments are provided for the fluid actuated reciprocating anchoring and pivot point of the toggle mechanism, such that the stroke provided by the fluid actuated mechanism may be precisely determined, together with the extreme positions of the reciprocating member.

The present invention provides an arrangement for compound reciprocation of a press ram and for precisely determining the extreme dwell positions of the ram. By thus providing a compound stroke of the press ram, part of the stroke being mechanically effected by a toggle mechanism and part of the stroke being pneumatically or hydraulically effected, the motion increments being either consecutive or simultaneous, according to the appropriate timing of the beginning and end of the two separately controlled motions, diverse results can be achieved by the present invention.

One such result is that, in arrangements where the end of the ram is provided with a clamping mechanism for the positioner anvil, by proper timing of the clamping step pneumatic or hydraulic pressure may be exerted on the anvil prior to final mechanical clamping provided by the toggle mechanism, so that the clamping pressure applied on the anvil may be more progressive and is effected with a cushioning effect.

Another result is that, in structures comprising punches mounted on the end of the ram, such punches being adapted to penetrate into the die cavities and compact the material therein in the die bore between the end face of the ram mounted punches and the end face of oppositely reciprocating punches disposed in the die bore, compacting of the powder material can be effected in a more progressive manner as compared to methods using a mechanically actuated upper punch, and the density of the finished part is greatly improved as compared to the density of parts compacted under more conventional methods. When compacting certain powder materials, either due to their composition or due to the binder used to bind the particles of powder together, after filling of the die cavity and when the lower punches are advanced in the die bores the frictional effect of the die bore wall on the powder and the tendency of the powder material to stick to the die bore wall cause a pre-compacting of the powder material at progressive levels from the level in engagement with the lower punch compacting face throughout the mass of the powder material. This results in a greater density of the finished part at the levels closer to the compacting face of the lower punch than at levels farther removed from the lower punch compacting face. When the part is compacted between opposite punches, and the upper punch is held stationary during compacting, or an anvil overlapping the die cavity is used, the density of the finished part, when using that type of sticky powder material, is greater proximate its lower surface than it is at the core or at the upper surface of the finished part. The press ram mechanism of the present invention permits, by proper timing of the pneumatic or hydraulic ram motion relative to the ram motion caused by the mechanical toggle mechanism, to tailor with precision the amount of motion and the pressure exerted by the upper punches during their reciprocation, either contemporaneously with the reciprocation of the lower punches or subsequently thereto, such that during displacement of the upper punches, while maintaining the lower punches stationary, for example, the density of the finished part proximate its upper surface is greatly increased, thus forming a finished article having a more constant density throughout its thickness.

SUMMARY OF THE INVENTION

The present invention, consequently, by combining mechanical toggle action with pneumatic or hydraulic motion for the ram of a press permits to determine with precision the dwell positions of the ram of the press, provides a smooth and cushioned reciprocation of either upper punches or of an anvil clamping member, and permits to obtain finished parts of a better quality and density than heretofore obtainable. Diverse benefits resulting from the present invention, and other objects and advantages of the invention, will become apparent to those skilled in the art when the following description of the best mode contemplated for practicing the invention is read in conjunction with the accompanying drawing wherein:

DETAILED DESCRIPTION OF THE PREFERRED EMBODIMENT

Figure 1:
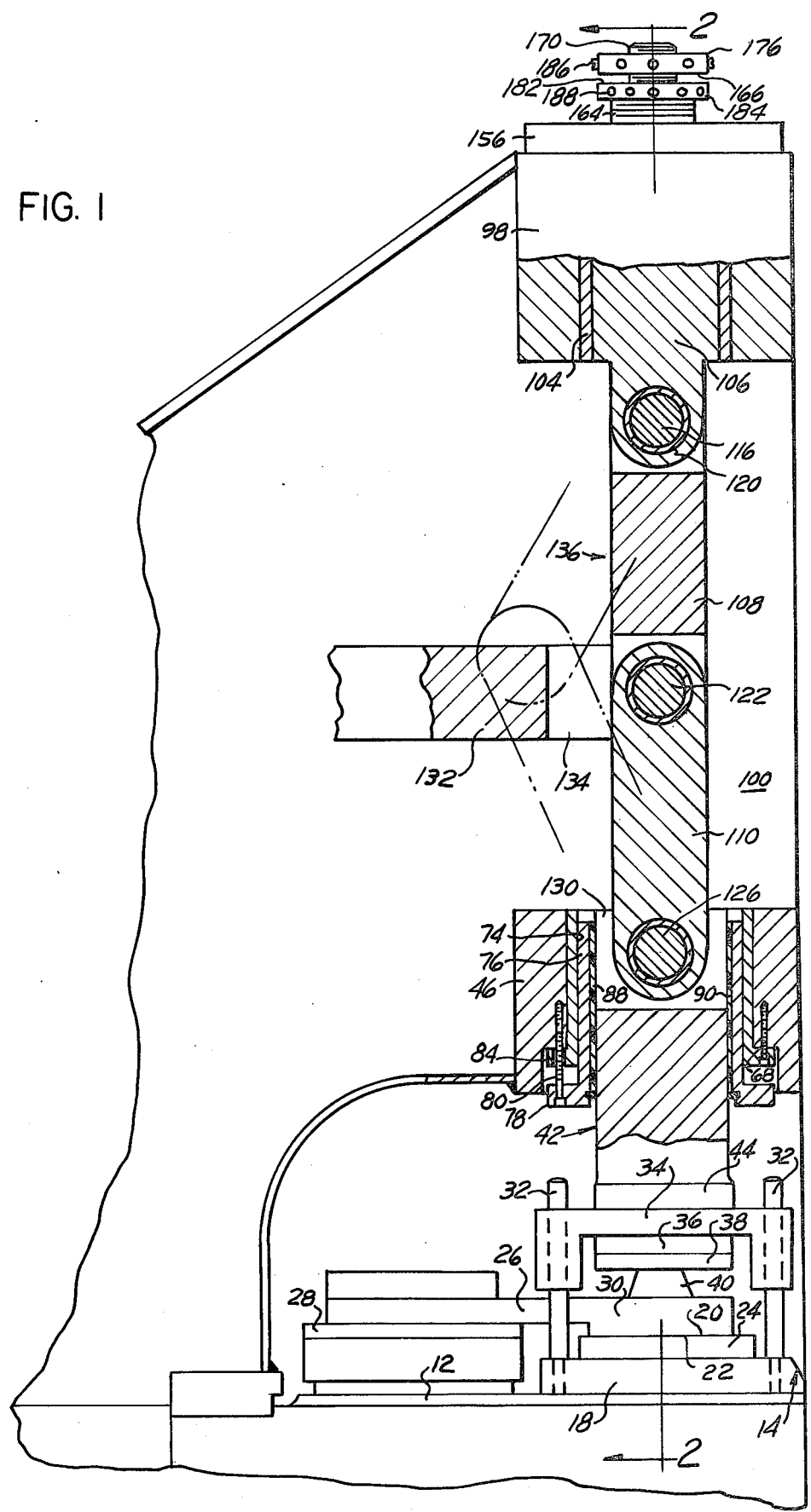
FIG. 1 is a side elevational view of a powder compacting press ram mechanism, according to the present invention, partly in section.
Figure 2:
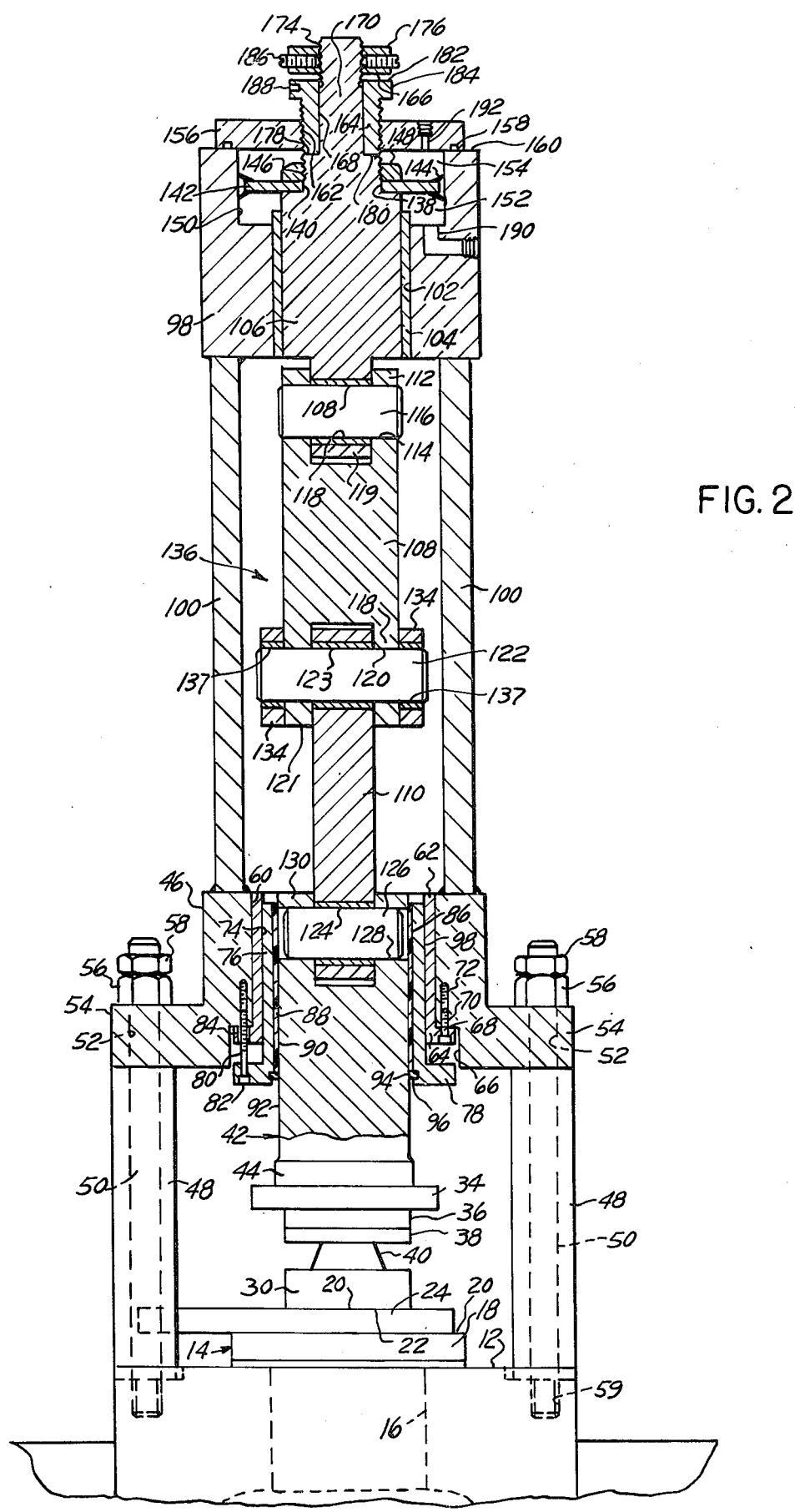
FIG. 2 is a sectional view thereof substantially along line 2—2 of FIG. 1.

Referring to FIGS. 1-2, a press is illustrated as comprising a massive frame 10 including a table 12 supporting a punch and die assembly 14 disposed in an opening 16 of the table 12. The punch and die assembly 14 may be according to any one of the structures disclosed, for example in U.S. Pat. Nos. 3,414,940, 3,561,056, 3,574,892, 3,726,622, 3,805,370 and 3,822,974, including a die plate spacer 18 bolted on the top of the table 12. The die plate spacer 18 in turn supports a die plate 24 provided with one or more die bores each having a vertically disposed reciprocating punch, not shown, reciprocable by the drive mechanism of the press, also not shown.

The die plate 24 has an upper surface 20 slidably engaged by the lower face 22 of a work station positioner 30, which is arcuately displaceable over the die plate and positionable in timed relationship with the press drive by being mounted on the end of a support arm 26 arcuately movable by the drive mechanism 28 (FIG. 1). The work station positioner 30 is provided with a powder dispenser, an anvil and a part ejection pick-up head arranged as explained, for example in U.S. Pat. Nos. 3,730,659, 3,726,622 and 3,415,142. For the sake of illustration, only the upper portion 40 of the anvil is shown.

As best shown at FIG. 1, the die plate spacer 18 has a pair of vertically extending columns 32 on which is slidably mounted a reciprocable saddle 34. A block 36 is fastened on the bottom of the saddle 34, the block 36 forming a holder for upper punches, not shown, in arrangements where it is desired to provide the powder compacting punch and die assembly 14 of the press with upper punches, or a holder for a platen 38, in the example of structure illustrated, adapted to engage the clamping block 40 of the anvil 30. In structures where upper punches are not used, the saddle 34 and the columns 32 may be omitted.

A ram 42 has an end 44 fastened to the top of the saddle 34 for reciprocating the saddle toward and away from the die plate 24. The ram 42 is slidably supported by a housing 46. The housing 46 is mounted above the press table 12 by means of rectangular or square support columns 48, each accepting therethrough a stud 50 having its upper end passed through an appropriate mounting aperture 52 disposed in an integral boss 54 formed in the housing 46, a nut 56 and a lock nut 58 being threaded on the end of the stud 50 and clamping the housing 46 on the top of the support column 48. The other end of each stud 50 is press-fitted or threaded tight in an appropriate mounting threaded bore 59 in the table 12.

For the purpose of slidably supporting the ram 42, the housing 46 has a bore 60 in which is fitted a sleeve 62 having an annular flange 64 disposed in an enlarged portion 66 of the bore 60, mounting bolts 68 being passed through appropriate mounting apertures 70 through the flange 64 and threading in appropriate threaded mounting bores 72 holding the sleeve 62 in position. The sleeve 62 defines a bore 74 slidably accepting a split bearing sleeve 76, also provided with an annular flange 78 which is normally spaced apart from the flange 64 of the sleeve 62. The bearing sleeve 76 has a longitudinally extending slit, not shown, and is adjustably held in position by means of relatively long bolts 80 passed through a mounting aperture 82 disposed in the flange 78 and a corresponding aligned aperture 84 in the flange 64 of the sleeve 62. The bearing sleeve 76 has a bore 86 coated with a relatively thin coating 88, for example 0.030 in. thick, preferably made of a self-lubricating plastic material such as tetrafluoroethylene, nylon or the like, and provided with a smooth cylindrical bearing surface 90 snuggly but slidably accepting the peripheral surface 92 of the ram 42. An annular seal 94 is disposed in an annular groove 96 internally formed in the bearing sleeve 76 proximate its lower open end. The annular seal 94 acts as a wiper preventing any dirt from being introduced between the peripheral surface 92 of the ram 42 and the bearing surface 90 of the bearing sleeve 76. The peripheral surface 98 of the bearing sleeve 76 is slightly tapered, for example, has a taper of 1°-2°, and the inner bore 74 of the sleeve 62 has a corresponding taper, such that the amount of tightness of the bearing sleeve 76 on the peripheral surface 92 of the ram 42 can be adjusted with precision, and any play due to wear can be compensated for, by tightening the bolts 80, thus advancing the bearing sleeve 76 within the tapered bore 74 of the sleeve 62 and contracting the bearing sleeve 76 which causes a reduction of its inner diameter with an accompanying closing of the width of its longitudinal slit, not shown.

The housing 46 supports a fluid cylinder housing 98, in spaced-away aligned relationship, by way of a pair of side plates 100 having their lower edge welded to or cast with, the top of the housing 46 and their upper edge welded to, or cast with, the bottom of the cylinder housing 98. The cylinder housing 98 has an open end forming a bore 102 provided with a bronze, or other low friction material, bushing 104 press-fitted or otherwise mounted in the bore 102. The bushing 104 forms a linear bearing for a slide 106 reciprocable therein. The end of the slide 106 projecting at the bottom of the cylinder housing 98 is connected by means of a pair of pivoting articulated connecting rods 108 and 110 to the top of the ram 42. The connecting rod 108 is provided with a first bifurcated end 112 having a transverse bore 114 in which is press-fitted a pin 116 passed through a transverse aligned bushing bore 118 formed in the projecting end 119 of the slide 106, the projecting end 119 having a width fitting between the parallel bifurcated portions 112 of the connecting rod 108. The other end of the connecting rod 108 has a similarly bifurcated portion 121 provided with a transverse bore 120 through which is press-fitted a pin 112 which forms a pivoting connection between the connecting rod 108 and the connecting rod 110, the appropriate end of the connecting rod 110 being provided with a bushed bore 123 pivotably accepting therethrough the pin 122. In a similar manner, the other end of the connecting rod 110 has a bushed transverse bore 124 pivotably accepting a pin 126 press-fitted into a corresponding transverse bore 128 formed in the upper end of the ram 42 which has a bifurcated portion 130 accepting therebetween the end of the connecting rod 110.

Figure 5:
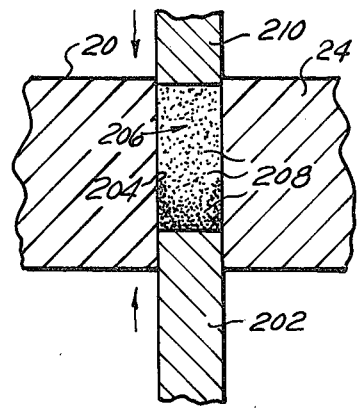

As best shown at FIG. 1, a link or toggle actuating arm 132 is also pivotably connected to the intermediary pin 122 by means of its bifurcated end 134, each portion of the bifurcated end 134 being provided with a bushed bore 137 pivotably accepting the end of the pin 122. The link arm 132 and the connecting rods 108 and 110 form in combination the toggle mechanism 136 whose function it is to mechanically reciprocate the ram 42 up and down relative to the housing 46, by means of an appropriate linkage, lever and cam arrangement, not shown, causing the arm 132 to be displaced from the position shown in full lines at FIG. 1, whose position is representative of the bottom dwell position of the ram 42, to the position shown in phantom line which urges the connecting rods 108 and 110 to pivot around their end axis of rotation defined by the pins 116 and 126 respectively, to the position shown in phantom lines, thereby displacing towards the left as seen in FIG. 5, the pin 122 such as to raise the ram 42. The mechanism for actuating the toggle mechanism 136 reciprocating the ram 42 may be any appropriate mechanism actuated by the press drive mechanism, such as the one disclosed in detail in U.S. Pat. No. 3,826,599.

The upper end of the slide 106 has a reduced diameter portion 138 over which fits an aperture 140 formed in a disk-shaped piston member 142 provided at its edge with a pair of annular elastomeric sealing rings 144. A portion of the reduced diameter portion 138 of the slide 106 is provided with a thread, as shown at 146, over which is threaded a retaining nut 148, holding the piston disk 142 in position on the slide 106. The piston disk 142 extends within an enlarged bore 150 formed concentric with the bore 102 of the cylinder housing 98, and the piston disk 142, together with the sealing rings 144, forms a separation between the lower chamber 152 and the upper chamber 154 thus defined in the cylinder bore 150.

The chamber 154 is closed by an end plate 156 fastened on the upper end face 160 of the cylinder housing 98. The end plate 98 is provided with a sealing ring 158 disposed in an appropriate circular groove and engaging the end face 160 of the cylinder housing 98. The end plate 156 has a centrally located internally threaded bore 162 through which is threaded the reduced diameter portion 164 of a flanged plug 166. The flanged plug 166 has an internal bore 168 slidably accepting a further reduced diameter projecting end portion 170 of the slide 106, an annular ring, such as ring 172, being disposed in an appropriate peripheral groove in the reduced diameter projecting portion 170. The extreme end of the reduced diameter portion 170 is provided with a thread, as shown at 174, threadedly accepting a collar 176 thereabout.

An annular shoulder 178, formed between the intermediary reduced diameter portion 138-146 of the slide 106 and the projecting reduced diameter end portion 170 thereof, defines an abutment engagable with the end 180 of the tubular plug 164. In a similar manner, the end face 182 of the flange portion of the flanged plug 166 forms an abutment engageable with the lower annular surface 184 of the collar 176. As the collar 176 is longitudinally adjustably positionable along the threaded portion 174 of the reduced diameter portion 170 of the slide 106, which position may be secured and maintained by means of tightening one or more set screws such as set screw 186 radially disposed through the collar 176, and as the flanged plug 166 is adjustably threadably positionable in and out of the cylinder end plate 156, any downward motion of the piston 142 and consequently of the slide 106 is limited as soon as the abutments 182 and 184 engage. Any upward motion of the slide 106 is adjustably limited as soon as its shoulder 178 engages the end face 180 of the flange plug 164. Radial apertures, such as radial apertures 188, are formed in the flange portion of the flanged plug 166, to permit adjustment of the longitudinal position of the flanged plug 164 by rotating the flanged plug by means of a steel rod, or other tool, introduced through an aperture 188 to apply a torque rotating the flanged plug 166.

The piston 142, and consequently the slide 106, may be reciprocated by introducing and exhausting pressurized fluid into and from the chambers 152 and 154 by means of, respectively, ports 190 and 192. When pressurized fluid is introduced into the chamber 152 through port 190, while at the same time fluid is exhausted from the chamber 154 through port 192, the piston 142, and consequently the slide 106, is displaced upwardly until the abutments 178 and 180 engage, as shown at FIGS. 1 and 2. When pressurized fluid is introduced into the chamber 154 through the port 192, while fluid is exhausted from the chamber 152 through the port 190, the piston 142 and the slide 106 are displaced downwardly, thus separating the abutment 178 from the abutment 180, until the abutments 182 and 184 engage. The displacement of the slide 106 thus displaces the upper fulcrum point of the toggle mechanism which corresponds to the pivoting pin 116, thus causing the ram 42, and consequently its end plate 38, to be displaced or positioned downwardly further than the downward displacement resulting from the toggle mechanism 136 at its lower dwell position. Conversely, the upward displacement of the slide 106, resulting from the upward displacement of the piston 142, causes in turn an upward displacement of the pivot pin 116 which in turn causes an upward displacement of the end plate 38 of the ram 42.

The stroke of the ram 42 resulting from the operation of the piston 142 in the fluid cylinder 98, and the upper and lower extreme positions of the slide 106, are determined by the adjustment of the flanged plug 166 and of the collar 176. The pressurized fluid used for reciprocating the piston 142 may be a hydraulic fluid or a pneumatic fluid, such as compressed air, where it is desired to take advantage of the cushioning effect of a pneumatic system. The valve, not shown, used for introducing and exhausting fluid respectively into and from the chambers 152 and 154 through the ports 190 and 192 is operated by an appropriate adjustable cam on the drive mechanism of the press, such that the operation of the fluid cylinder may be adjustably timed to occur at any portion of the cycle of operation of the ram 42 caused by the toggle mechanism 136, or at the end of such cycle, at the beginning of such cycle, or at any other time. The direction of displacement of the piston 142, and therefore of the slide 106 may be the same as the direction of displacement of the ram 42 which is caused by the toggle mechanism 136, or it may be in an opposite direction.

When it is desired to render inoperative the hydraulic or pneumatic operation of the slide 106, the collar 176 is adjusted such that its abuting annular surface 184 engages the annular end surface 182 of the flanged plug 166, the flanged plug 166 having been first adjusted such that its end face abutment 180 engages the shoulder abutment 178 of the slide. In this manner, the fulcrum axis of the pin 116 may be be adjusted up and down to any fixed reference position, within the range provided by the adjusting mechanism. Once a fixed adjustment is provided, the ports 190 and 192 may be disconnected from the source of pressurized fluid, thus disabling the fluid operation of the ram.

In addition to providing for ease of adjustment of a reference position for the ram 42, and in addition to providing auxiliary means for operating the ram 42, in cooperation with the toggle mechanism 136, the present invention presents the further advantage or providing added flexibility for the reciprocating motion of the ram 42, and by appropriate timing, of providing compound or successive motions of the ram, one by the mechanical means provided by the toggle mechanism and the other by the auxiliary means provided by the fluid-operated ram actuator. An example of such advantage is to provide a cushioned, more particularly when pneumatic fluid is used, actuation of the piston 142 and therefore of the slide 106 and ram 42, for clamping the anvil 30 on the top surface 20 of the die plate 24.

Figure 3:
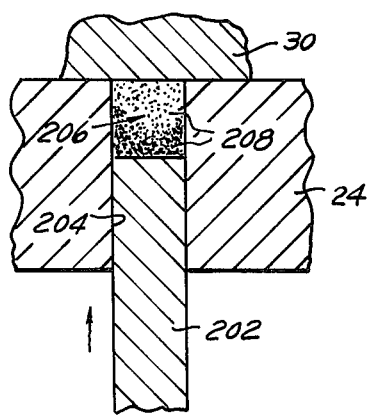
FIG. 3 is a schematic view of a compacting step for forming a compacted article and showing the resulting prior density quality of the compacted part.

Another advantage of the invention, when the end plate 38 of the ram 42 is used for actuating either independent upper punches or upper punches built in the anvil as disclosed for example in U.S. Pat. No. 3,775,032, is diagrametically and schematically illustrated at FIGS. 3-6. FIG. 3 illustrates an example wherein an article is compacted of powder material between the end of an anvil 30 and the end face of punch 202 disposed reciprocably in a bore 204 in the die plate 24. Prior to compacting of the article by means of reciprocating the punch 202 towards the end face of the anvil 30 overlapping the die opening or bore 204, the die cavity has been filled with powder material 206 formed of a multitude of solid fine particles 208 of metal, ceramic, or the like, mixed with a small qualtity of binder and sometimes a lubricating agent. For certain compositions of powder material, with binder and lubricant added, the powder may be lacking in fluidity or flowability, and be relatively tacky or "sticky". When the punch 202 is displaced upwardly, even without the anvil 30 being place over the die cavity, the frictional effect on the powder 206 of the wall of the die bore 204 is enough to cause a relative pre-compacting of the powder material, even with powder material which is not tacky, such amount of pre-compacting gradually decreasing from the level corresponding to the end face of the punch 202 as a function of the distance of a given particle 208 from such end surface of the punch. As soon, therefore, as the punch 202 is displaced upwardly, the density of the powder material is greater at its bottom and gradually decreases as a function of the height, such non-uniform but progressively decreasing density being shown at FIG. 3 artibrarily by a closer packing of the particles 208 proximate the end face of the punch 202, such closer packing decreasing as a function of the location of the particles away from the face of the punch 202. In addition, and because the particles 208 coated with binder tend to stick to the wall of the die cavity, the frictional effect of the wall causes a denser packing of the particles together proximate the wall than towards the center of the mass of particles. The result is that when the article is finally compacted, the density is approximately that shown at FIG. 3, that is the density of the article is greater about its periphery and its bottom that it is at its top and at its center. Even gravity tends to cause an increased density at the bottom of the compacted article as soon as powder material is poured into the die cavity, and even before any displacement of the punch 202 occurs.

The present invention permits to tailor with precision the stroke of a press ram, which in turn permits to tailor with precision the stroke of an upper punch mounted on the ram end, dynamically, i.e., as far as the velocity and direction of motion is concerned, statically, i.e., as far as the pressure exerted by the diverse punches and the progression of such pressure, and in any appropriate timing relationship. Consequently, use of the present invention leads to methods permitting to obtain finished parts having a more constant and consistent density, from part to part, and a much improved and more constant throughout density within each single part, than heretofore achievable.

Figure 4:
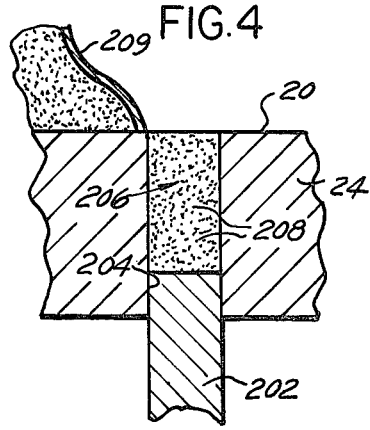
FIGS. 4-5 are schematic illustrations of subsequent progressive steps for compacting an article made of powder material, according to the method provided by the present invention, and depicting diagrametically the improved constant density of the compacted powder article thus obtained.
Figure 6:
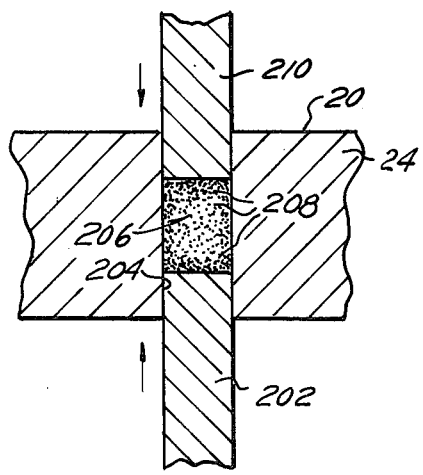
FIG. 6 is a schematic illustration of another example of advantage resulting from the present invention.

FIGS. 4-6 illustrate consecutive steps, in a schematic manner, illustrating the results achieved by the present invention. At FIG. 4, a lower punch 202 is shown in a substantially retracted position in a die cavity 204 in a die plate 24. The die cavity 204 has been filled with powder material, flush with the upper surface 20 of the die plate, any excess of powder material 206 having been wiped away by the edge of the powder dispenser 209, such that the top level of the powder material 206 remaining in the die cavity 204 is substantially flush with the top surface 20 of the die plate 24. Subsequently, as shown at FIG. 5, the punch 202 is further retracted of a small distance, and an upper punch 210 is advanced such that its end just penetrates into the die cavity 204. At this time, the punch 202 is advanced upwardly, which causes a pre-compaction of the powder material 204 at the bottom of the mass of powder material, as a result of the friction between the particles 208 and the wall of the die cavity 204. As shown at FIG. 6, the upper punch 210 is then progressively advanced into the die cavity 204, at a rate greater than the advance of the lower punch 202, such as to create a progressive compaction of the mass of powder material 206, causing a density at the top of the mass substantially equal to the density at the bottom of the mass.

Figure 7:
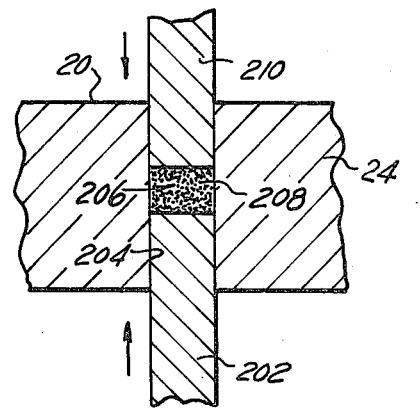

FIG. 7 illustrates the end of the compaction step, wherein the mass of powder material 204 has been collapsed to a substantially reduced mass, with density substantially equal throughout the mass. This may be obtained by progressively advancing the punch 210 within the die cavity 204 at a rate slightly higher than the rate of advance of the punch 202. In addition, if it is so desired, because the ram 42 of the press of FIGS. 1-2 may still be reciprocated by means of the fluid mechanism of the invention at the lower dwell position of the ram 42 supporting the punch 210, it is possible to finish the compacting of the powder material 208 between an advancing upper punch 210 and a receding lower punch 202 which, especially in the compacted form of the powder material, increases the friction of the peripheral particles 208 on the wall of the die bore 204, with the result of achieving an even more uniform density of the compacted part.

Figure 8:
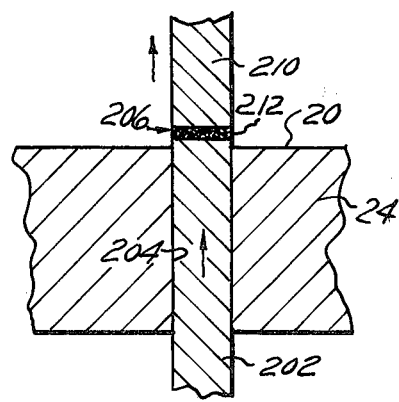

FIG. 8 illustrates a further example of one of the advantages provided by the present invention. When relatively thin parts, such as part 212, are formed by compacting powder material between the end face of a reciprocating lower punch 202 and the end face of a reciprocating upper punch 210, the upper punch 210 cannot be retracted so as to uncover the opening of the die cavity 204 in the die plate 18, prior to advancing the lower punch 202 to eject the finished part 212 from the die cavity because the thin part 212 is relatively fragile and can easily crumble, and retracting the upper punch 210 first creates a partial vacuum in the die cavity that may cause the part to collapse. If such partial vacuum in the die cavity does not cause the part 212 to collapse, further advance of the lower punch 202, as a result of the friction of the edge of the part 212 with the wall of the die cavity 204 may cause the part to collapse. Consequently, it is desirable that all during the ejection of a thin article 212 it be constantly supported between the end faces of the two punches 202 and 210. The present invention permits to effectuate a safe support from below and from above for a substantially thin article 212, after compaction, by continuing to apply pressure on the upper surface of the part by means of the end face of the upper punch 210 by correct adjustment of the pressure of the fluid in the chamber 152 (FIGS. 1-2), until the article 212 is ejected from the die cavity, slightly above the upper surface 20 of the die plate 18, at which time the punch 210 may be completely retracted by the ram toggle mechanism. It will be appreciated that the present invention permits to accomplish the same result when a thin article is compacted against the lower surface of an anvil, because the clamping pressure of the anvil may be progressively relieved as the lower punch 202 is advanced by progressively and adjustably increasing the pressure in the chamber 152 and withdrawing fluid from the chamber 154. If so required, the anvil may be mounted floating in the work station positioner 24, (FIGS. 1-2) with an upward directed bias counterbalancing the weight of the anvil, such that when released the bottom surface of the anvil is no longer in engagement with the upper surface of the finished article.

Having thus described the invention by way of an example of structural embodiment thereof, modification whereof will be apparent to those skilled in the art, what is claimed as new is as follows:

1. In a press comprising a table, a ram reciprocably movable relative to said table, first means for reciprocating said ram comprising a first connecting rod having an end pivotably attached to an end of said ram, a second connecting rod having an end pivotably attached to the other end of said first connecting rod and another end pivotably attached to a slide member and an arm pivotably attached at one end to said pivotable connection between said first and second connecting rods for displacing said pivotable connection to a position laterally moving said pivotable connection for displacing said ram away from said table to a position displacing said ram towards said table, and second means for reciprocating said slide member in timed relationship with the operation of said first means for additionally reciprocating said ram relative to said table, the improvement for said second means comprising a cylinder, a piston reciprocable in said cylinder and connected to said slide member, means introducing a pressurized fluid selectively to one side and the other of said piston for reciprocating said piston, and abutment means adjustably defining the extreme positions of motion of said slide member, said abutment means comprising a plug threadably mounted in an end closure plate of said cylinder and having an end disposed toward said piston engageable with a shoulder formed in said slide for limiting reciprocation of said slide in one direction, an end portion of said slide projecting through a bore in said plug and being provided with a thread, and a collar adjustably threadable on said threaded end portion forming abutment means engageable with abutment means provided on the other end of said plug for limiting reciprocation of said slide in an opposite direction.

2. The improvement of claim 1 wherein said plug and said collar are adjustable to a position wherein said plug end engages said shoulder simultaneously with said collar abutment means being engaged with said abutment means on said plug for immobilizing said slide in a fixed position.

* * * * *

UNITED STATES PATENT AND TRADEMARK OFFICE
CERTIFICATE OF CORRECTION

PATENT NO. : 4,166,716
DATED : September 4, 1979
INVENTOR(S) : Raymond P. DeSantis It is certified that error appears in the above-identified patent and that said Letters Patent are hereby corrected as shown below:

Col. 1, line 22, change "powder-driven" to --power-driven--.
Col. 3, line 58, cancel "40" and change "30" to --40--.
Col. 4, line 34, change "98" to --99--,
       line 68, change "112" to --122--.
Col. 5, line 28, change "FIG. 5" to --FIG. 1--,
       line 50, change "98", second occurrence to -- 156 --.
       line 58, delete "such as ring 172,".
Col. 7, line 46, change "qualtity" to --quantity--,
       line 52, change "place" to --placed--.
Col. 8, line 52, change "204" to --206--.
Col. 9, line 8, change "18" to --24--,
       line 12, change "creats" to --creates--,
       line 28, change "18" to --24--,
       line 40, change "24" to --30--.

Signed and Sealed this

Nineteenth Day of February 1980

[SEAL]

Attest:

SIDNEY A. DIAMOND

Attesting Officer

Commissioner of Patents and Trademark